United States Patent

Ogasawara et al.

[11] Patent Number: 5,822,604
[45] Date of Patent: Oct. 13, 1998

[54] METHOD OF OPTIMIZING RECOGNITION OF COLLECTIVE DATA MOVEMENT IN A PARALLEL DISTRIBUTED SYSTEM

[75] Inventors: Takeshi Ogasawara, Hachioji; Hideaki Komatsu, Yokohama, both of Japan

[73] Assignee: International Business Machines Corporation, Armonk, N.Y.

[21] Appl. No.: 873,472

[22] Filed: Jun. 12, 1997

[30] Foreign Application Priority Data

Jun. 17, 1996 [JP] Japan ..................................... 8-155831

[51] Int. Cl.$^6$ ....................................................... G06F 15/80
[52] U.S. Cl. ........................................ 395/800.1; 395/706
[58] Field of Search ........................... 395/200.3, 800.01, 395/800.1, 800.16, 670, 376, 705, 706, 500, 701, 712

[56] References Cited

U.S. PATENT DOCUMENTS

| | | |
|---|---|---|
| 5,475,842 | 12/1995 | Gilbert et al. ............................ 395/706 |
| 5,548,761 | 8/1996 | Balasundaram et al. ................ 395/707 |
| 5,598,561 | 1/1997 | Funaki ..................................... 395/706 |
| 5,598,570 | 1/1997 | Ho et al. ............................. 395/800.12 |
| 5,634,059 | 5/1997 | Zaiki ........................................ 395/706 |
| 5,652,874 | 7/1997 | Upson et al. ............................ 395/500 |
| 5,659,701 | 8/1997 | Amit et al. .............................. 395/684 |
| 5,659,778 | 8/1997 | Gingold et al. ..................... 395/800.11 |
| 5,682,544 | 10/1997 | Pechanek et al. .................. 395/800.11 |
| 5,692,193 | 11/1997 | Jagannathan et al. .................. 395/676 |
| 5,737,623 | 4/1998 | Liebrock ............................ 395/800.13 |

*Primary Examiner*—Alpesh M. Shah
*Attorney, Agent, or Firm*—James E. Murray

[57] ABSTRACT

To optimize collective data movement recognition in a parallel distributed system a data movement set is formed into a data structure where access regularity is efficiently used with respect to problems, and processor expression independent of the number of processors in the parallel distributed system is introduced. By using the data structure and the processor expression, the data movement set is calculated for each dimension of an array, and the collective data movement is extracted when constructing data movement from the data movement set of each dimension.

2 Claims, 4 Drawing Sheets

```
      subroutine lu_fact_kernel(a,k,n)
      real*8 a(n)
!HPF$ processors p(number_of_processors())
!HPF$ distribute a(*,cyclic) onto p
      do j=k+1, n
        do i=k+1, n
          a(i,j) = a(i,j)-a(i,k)*a(k,j)
        end do
      end do
      end
```

```
      integer a(N,N)
!HPF$ processors p(number_of_processors()/4,4)
!HPF$ distribute a(block,block) onto p
      call sub(a)
      end
      subroutine sub(a)
      integer a(N,N)
!HPF$ processors p(number_of_processors()/4,4)
!HPF$ template t(N,N)
!HPF$ align a(i,*) with t(i,*)
!HPF$ distribute t(block,block) onto p
```

FIG. 8
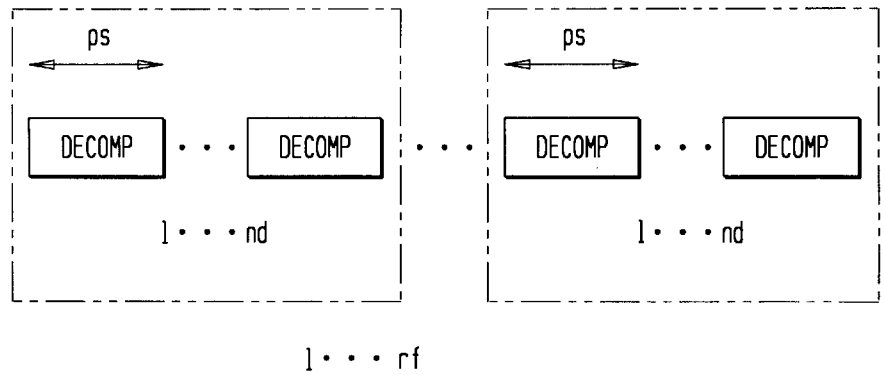
FIG. 9
| ARRAY DIMENSION | DATA MOVEMENT SOURCE 4-PIECE SET | | | FIRST ITR BLOCK | | SECOND ITR BLOCK | |
|---|---|---|---|---|---|---|---|
| | PROCESSOR JUMP WIDTH | NUMBER OF DIVISIONS | TOTAL NUMBER OF PROCESSORS | ARRAY SECTION | DATA MOVEMENT DESTINATION 4-PIECE SET | ARRAY SECTION | DATA MOVEMENT DESTINATION 4-PIECE SET |
| 1 | 1 | 2 | 8 | (1:49) | (1:1:2:4) | (51:99) | (2:1:2:4) |
| | | | | (50:50) | (2:1:2:4) | | |
| 2 | 2 | 2 | 8 | (0:49) | (1:2:2:4) | (50:99) | (2:2:2:4) |
FIG. 10
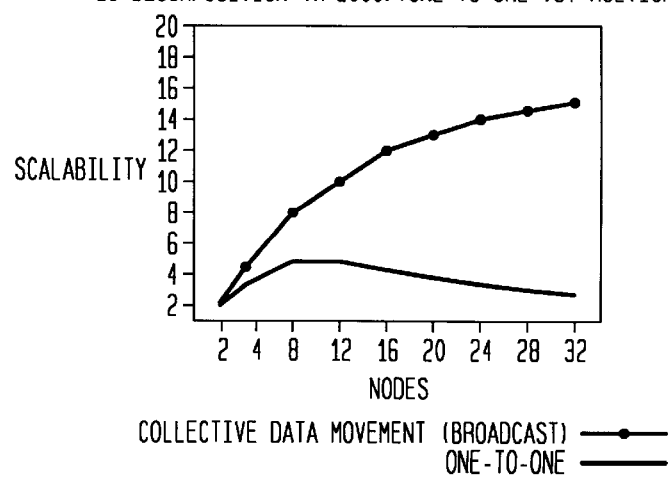

METHOD OF OPTIMIZING RECOGNITION OF COLLECTIVE DATA MOVEMENT IN A PARALLEL DISTRIBUTED SYSTEM

FIELD OF THE INVENTION

The present invention relates to a method of optimizing recognition of collective data movement in a parallel distributed system.

BACKGROUND OF THE INVENTION

In software applications described in parallel data language for a parallel distributed system such as a parallel distributed computer, codes for transmitting data on a remote host necessary for calculation on a local host are generated by a compiler. This parallel data language has an important role in writing a parallel program with a parallel computer. Particularly, when a system such as this executes a numerical calculation on a large scale, it is very important that a compiler can suitably detect the collective data movement of a processor. Collective data movement recognition by a compiler processing system, can be described as follows:

(1) The kind of data movement in a parallel data language program;

(2) The optimization of data movement by a compiler; and (3) Collective data movement library.

(1) Data Movement in a Parallel Data Language Program

Data movement between processors in a parallel data language program is roughly classified into: i) data movement for prefetching data before execution of a parallel loop and ii) data redistribution for a change in an array distributing method. The term "pref etch" means that data is transmitted in advance before loop execution, from a processor with data on a right side array region, which is read out and referred to, to a processor which performs calculation of an executive statement.

The term "redistribution" means to distribute an array again. Redistribution becomes necessary where it is expected that a change in the array distributing method can enhance execution performance from the nature of algorithm. In such a case a right side array region, which is read out and referred to, is suitably redistributed before algorithm execution. The redistribution is also performed in the case where the distribution method of an argument array changes at a subroutine boundary.

i) Prefetch Example

FIG. 1 contains a program list (e.g., a kernel loop of LU decomposition), in high performance FORTRAN (hereinafter referred to as HPF), used in describing a prefetch. The data movement analysis which is performed by a parallel data language compiler is the calculation of a data movement set, in which one processor Pi transmits a right side array region $R_k$ which is accessed during loop execution to another processor $P_j$.

To form a parallel loop, a compiler generates the data prefetch code of a right side array operand, a(i,k), before a doubly nested loop. If the loop is executed along an "owner computes rule" by NP processors, a processor p where an array region a(:,k) is divided and held will need to transmit an array region a(k+1:n,k) to processors which own an array region a(k+1:n,k+1:n) which is accessed at the left side. That is, the data movement set comprises a transmitting processor p to which a(k+1:n,k) is distributed and a receiving processor group to which a(k+1:n,k+1:n) is distributed.

FIG. 2 is a conceptual diagram used to explain the data movement in such a prefetch. In the figure, reference characters (k, i, j, and n) correspond to the variables in the program of FIG. 1. A strip of regions indicates an array that has been cyclically divided, and the shaded portion indicates the array region which is transmitted.

ii) Redistribution Example

Redistribution will take place where an array has been divided into regions (block, block), when a subroutine in a program list, such as that shown in FIG. 3, is called out. FIG. 4 is a conceptual diagram used to explain the data movement in redistribution. In the figure, square regions indicate regions into which an array a was divided. An array region distributed first to two-dimensional processor form p(i,j) is taken to be $A_{ij}$. When a subroutine (sub (a)) is called out, redistribution takes place so that each processor of the first dimension i of the two-dimensional processors has the same array region $(A_{i1}, \ldots, A_{in})$. In the data movement set, processors p(i,:) receive array regions $(A_{i1}, A_{in})$ from the respective distributors, and processors p(i,j) transmit $A_{ij}$ to processors p(i,:).

(2) Optimization of Data Movement by a compiler

The data movement between processors in a program described in parallel data language such as HPF, is extracted by a compiler. In this extraction, it is important to optimize data movement so that the characteristics of the parallel computer are used efficiently. This optimization becomes very important in a parallel data language where an array is distributed between processors of a parallel distributed memory computer having a memory for each processor. In a computer such as this, a local processor makes a calculation by using data which is not resident in its memory. Since the time it takes to move data is very slow compared with the time to access a memory, the overhead of the data movement has a direct influence on the performance of the parallel computer.

(3) Collective Data Movement Library

A parallel computer system is provided with a collective data movement library which is a data movement optimizing subsystem for making the efficient use of a network. When data movement between processors matches a pattern defined in the library, optimum data movement is performed in accordance with the library. Message Passage Interface (MPI) is well known as the international standard of the collective data movement library. In order to enhance the performance of a parallel application, it is important how the collective data movement library can be efficiently used when data movement is needed. For example, in the program list of FIG. 1, a library called broadcast data movement can be applied. In the list of FIG. 3, a library called all gather data movement can be applied.

In the conventional approach in collective data movement, the method of distributing a left side array and a right side array, existing in the main body of a loop, is determined at the time of compiling. This determination is made under the assumption that distributed processor forms are identical. This approach is limited in that only one kind of processor form is recognized at the time of compiling. In addition, the approach is not applicable where the distribution method is determined at runtime or where an array region to be transmitted varies at runtime. Therefore, the conventional approach cannot be applied where: i) processor forms on the left and right sides are different; ii) the method of distributing a right side or left side array is determined at runtime, and iii) the right side or left side region to be accessed is determined at runtime.

Since, in generally used applications, there are many cases where prefetch or redistribution is performed in arbitrary processor form and an arbitrary array division method, the conventional approach at the time of compiling cannot be effectively applied to realistic applications. A method of recognizing collective data movement at runtime has been proposed (i.e., a method which utilizes scatter data movement, gather data movement, and all-to-all data movement). However, its calculation quantity 0 ($n_o$ +. . . $n_{0-1}$) ($n_i$ is the size of the i-th array) for an m-dimensional array, is not suitable for a large scale numerical calculations.

Therefore, it is an object of the present invention to provide a method of optimizing recognition of collective data movement in parallel distributed systems.

It is another object of the present invention to have the steps of forming a data movement set into a data structure where access regularity is efficiently used with respect to regular problems and introducing processor expression independent of the number of processors, calculating the data movement set for each dimension of an array by using said data structure and said processor expression, and extracting the collective data movement when constructing data movement from said data movement set of each dimension.

SUMMARY OF THE INVENTION

A method comprising the steps of forming a data movement set into a data structure (ITR list) where access regularity is efficiently used with respect to regular problems and introducing processor expression (a quadruplet) independent of the number of processors, calculating the data movement set for each dimension of an array by using said data structure and said processor expression, and extracting the collective data movement when constructing data movement from said data movement set of each dimension. In the present invention, collective data movement can be recognized at high speed at runtime with respect to regular problems. An expression method such as quadruplet processors are introduced in order to specify processors which participate in data movement, and data movement which is performed by a certain processor is described with an array region and this set of four expressions. When data movement is analyzed, recognition of collective data movement can be performed at runtime by the order of array dimensions regardless of the size of an array and the number of processors of a parallel computer, by making the best use of the regularity of a regular problem and by collective arithmetic defined on a set of four. Therefore, in the present invention, not only can the overhead during execution be reduced, but also the present invention is suitable for a large-scale numerical calculation on a super parallel computer.

DESCRIPTION OF THE DRAWINGS

FIG. 8 is a conceptual diagram for describing a quadruplet in detail;

FIG. 9 is a graph showing an example of an IOS; and

FIG. 10 is a graph showing the performance difference between the case where LU decomposition (kernel n=2000) used one-to-one data movement and the case where LU decomposition (kernel n=2000) used broadcast data movement by actually applying the algorithm of the present invention.

DETAILED DESCRIPTION OF THE INVENTION

Figure 5:
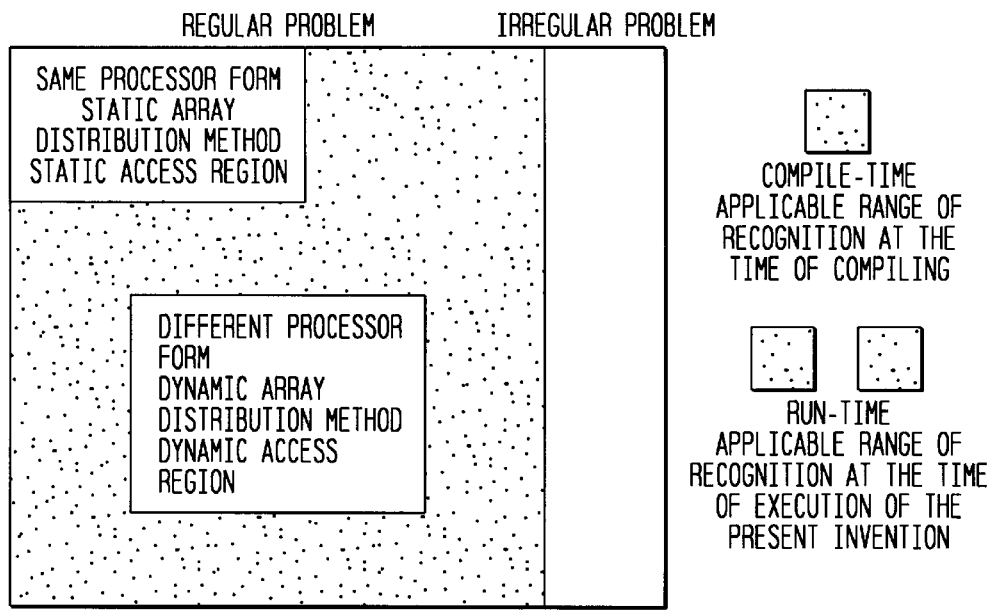
FIG. 5 is a conceptual diagram used to explain a range to which the present invention is applicable.

The present invention employs an ITR list and a quadruplet, and consequently there is no need to perform an exchange of information with another processor at runtime. Collective data movement for both prefetch and redistribution can be extracted by the same method and with a calculation quantity of the order of the number of dimensions of an array. This does not depend upon the size of the array and the scale of the parallel computer. FIG. 5 is a conceptual diagram used to explain a range to which the present invention is applicable.

Following is a description of an ITR list and a quadruplet which are features of the algorithm of the present invention. Further, high-speed recognition of collective data movement at runtime, based on the ITR list and the set of four expressions, will be explained.

A data movement set is formed into a data structure where access regularity can be efficiently used. The data movement set is expressed with an ITR list generated for each dimension of an array. The ITR list is constituted by a row of ITRs and ITR master which is the management information of the ITRs.

ITR: expresses an array region specified with a triplet (start: end: step) and a group of opponent processors of the region. ITR master: Management data structure contains information of which processor group should acquire which ITR on an ITR list.

Figure 6:
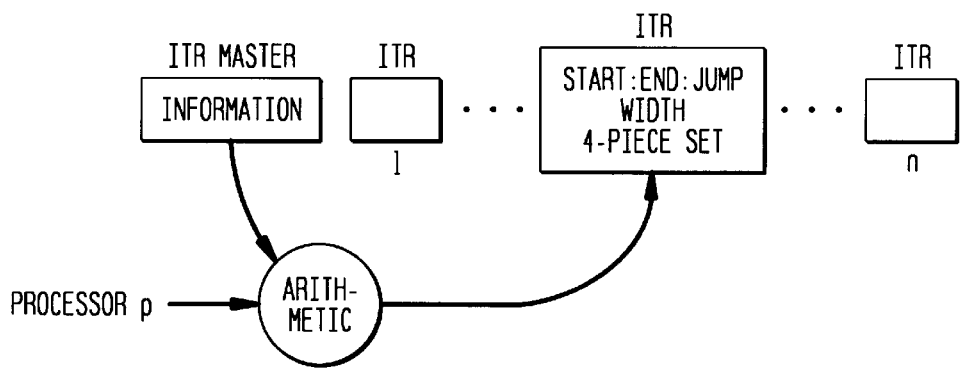
FIG. 6 is a conceptual diagram used to explain the data movement set calculation on an ITR list.

FIG. 6 is a conceptual diagram for explaining a data movement set calculation performed on the ITR list. When analyzing data movement, the ITR on the ITR list which is used is calculated on each processor. In many cases the array access method has regularity between processors with respect to regular problems, so the regularity is expressed in the form of compression based on the list rule by the ITR list. For example, in the array a(1:100) distributed to five processors in blocks, if an access is made at the array a(1:100), an array region which is accessed by the processor p will be parametrized by a processor ID as follows:

$$a(1+p*20:20+p*20).$$

In the calculation of the data movement set, a resultant ITR list is obtained by performing arithmetic for two ITR lists of each dimension of an array. One for how array regions to be referred, and the other for how array regions are owned by processors. An array section which is transmitted is expressed by a combination of ITRs which each processor acquired from the ITR list of each dimension for itself.

The data structure of the ITR list will be specifically described. An IOS (to be described later) such as that shown in FIG. 9 is expressed with the ITR list for each dimension of an array. As described above, the ITR list is constituted by ITR blocks and an ITR master which is a management data structure.

The ITR block is constituted by an array section $R_{ITR}$ specified by a triplet, start (bg), end (ed), and step (st), and a quadruplet, $Q_{ITR}=(dx:ps:nd:np)$ which specifies the data movement component of the section. Thus, the ITR block is a group of ITRs expressed as follows:

$$ITR = [R_{ITR}, Q_{ITR}] \quad \text{[Equation 1]}$$
$$= [bg:eg:st, dx:ps:nd:np]$$

The ITR block on the ITR list is also specified by a set called a data movement source quadruplet. This is distinguished from the aforementioned set of four, which an ITR describes, called a data movement destination quadruplet. In the case of transmission, the former represents a transmitting processor and the latter represents a receiving processor, and in the case of reception, they are reversed.

In the ITR master $M_{IRTL}$ there are described the "mps," "mnd," and "mnp" of the data movement source quadruplet. Each processor converts its processor ID to a data movement source quadruplet and acquires an ITR block to which it is related. A data movement source quadruplet which includes a processor with "pid" as its ID is calculated by the following equation:

$$mdx=1+mod((pid-1)/mps, mnd)) \quad \text{[Equation 2]}$$

Equation 2 calculates a decomposition position, mdx, by using the $M_{ITRL}$. The decomposition position, mdx, indicates the ITR block position on the ITR list (ITRL). ITRL is expressed as follows:

$$ITRL=<mps:mnd:mnp>\{[bg:ed:st,dx:ps:nd:np]\} \quad \text{[Equation 3]}$$

The ITRs of the ITR block of each array dimension, obtained in the aforementioned way, are combined for all dimensions by the following ITR product (represented by $\Diamond$) and specifies a single array region and the opponent data movement processor. In the case of a d-dimensional array, each of the $n_i$ $ITR^i_{ki}$ ($1 \leq i \leq d$) selected at the i-th dimension is expressed as $ITR^i_{ki}$ ($1 \leq k_i \leq n_i$), and the ITR block is expressed as $\{ITR^i_{ki}\}_{ki=1 \ldots ni}$. If done in this way, all data movements to which a processor relates, that is, the data movement set will be expressed as follows:

$$\{ITR^1_{ki} \Diamond \ldots \Diamond ITR^d_{kd}\}_{k1=1 \ldots n1, \ldots kd=1 \ldots nd} \quad \text{[Equation 4]}$$

In Equation (4), $ITR^1_{k1} \Diamond \ldots \Diamond ITR^d_{kd}$ is the data movement descriptor. The specific operation of the ITR product is as follows: If the array section and the data movement destination quadruplet, which are two constituent elements of the $ITR^1_{ki}$, are taken to $R^1_{ki}$ and $Q^i_{ki}$, $ITR^1_{k1} \Diamond \ldots \Diamond ITR^d_{kd}$ is expressed as follows:

$$ITR^i_{k_i} \Diamond \ldots \Diamond ITR^d_{k_d} = [R^1_{k_1}, Q^1_{k_1}]566 \ldots 566[R^d_{k_d}, Q^d_{k_d}] \quad \text{[Equation 5]}$$
$$= \|(R^1_{k_1}, \ldots, R^d_{k_d}), \bigcap_{i=1}^{d} Q^i_{k_i}\|$$

In Equation (5), $\|R, Q\|$ is the data movement descriptor, which has an array section R that is transmitted and a data movement destination processor Q. R is the Cartesian product element of ITR blocks where the ITR block is regarded as a set of $R^i_{ki}$, and Q is a product of sets when $Q^i_{ki}$ is regarded as a set of processors. The arithmetic of a product of sets can be executed at high speed because it is a bit vector conjunction.

Also, for the ITR list, as with an augmented regular section descriptor, a row of ITR blocks is compressed by making the best use of the regularity of ITR blocks. For example, $[i*10-9:i*10:1,i+1:4:32])_{i=1} \ldots 3$ is a compressed form which expresses three ITRs. With a compressed form, a processor can know an array section data movement destination processor, which is the content of an ITR to which the processor other than itself relates, without retrieving the ITR list. This is efficiently used when shift data movement is recognized.

When the ITR product is performed, an arithmetic $\cap$ is also performed for the data movement source quadruplet, $mdx:M_{ITRL}$. The result of the $\cap$ arithmetic is a group of processors having the same data movement descriptor. A plurality of processors with the same data movement source quadruplet exist. The data movement source quadruplet will have a natural expression among processors having the same data movement pattern for each dimension of an array. From the foregoing, by calculating a data movement descriptor to which it is related, a processor can know other processors which have a similar data movement pattern.

The IOS, shown in FIG. 9, is an example of a two-dimensional array. As an example, the data movement to which a processor P3.is related is extracted from the ITR list of each dimension of the IOS. For array dimension 1 of FIG. 9, the first ITR block is extracted by 1+mod((3-1)/1,2) obtained by substituting the values of Table of FIG. 9 into Equation (3). In like manner, for array dimension 2 of FIG. 9, the second ITR block is extracted one by one from each dimension by 1+mod((3-1)/2,2) (two ITRs for the ITR block of the first dimension and a single ITR for the ITR block of the second dimension). If the ITR product of the first ITR block [50:50,2:1:2:4] of the first dimension and the second ITR block [50:99,2:2:2:4] of the second dimension is considered, (50,50:99) will be obtained for the array section and (4:1:4:4) for the data movement destination quadruplet. This represents that P3 transmits array section (50,50:99) to P4. For the data movement source quadruplet, it is found that with (1:1:2:8) n (2:2:2:8), P7 performs the same data movement.

Quadruplet Expression

A quadruplet is employed as an expression of processor which does not depend upon the number of processors. An ITR on an ITR list and an opponent data movement processor described by the ITR are expressed by the following set of four expressions.

Figure 7:
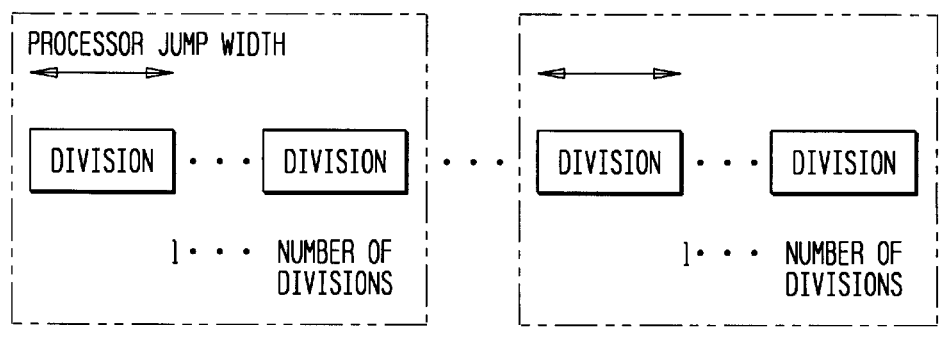
FIG. 7 is a conceptual diagram showing the calculation of a participation data movement processor based on a quadruplet.

Decomposition position
Processor Step
Number of Decompositions
Total Number of Processors FIG. 7 is a conceptual diagram showing the calculation of participation data movement processors based on a quadruplet. The number of iterations in this figure will be described later. A group of processors by a quadruplet are one-dimensional processor form expressions in arbitrary processor form. Therefore, the processor form difference in the data movement between arrays distributed to different processor forms is absorbed. In the combination for obtaining an array section which is transmitted, the set arithmetic of a quadruplet of ITRs and an ITR master is performed, and an opponent data movement processor group and a data movement source processor group are respectively calculated. One-dimensional processor form is generally realized by a bit vector and a computer can process bit vector arithmetic at high speed, so high-speed arithmetic can be accomplished even in the case of a great number of parallel computers.

In addition, in the algorithm of the present invention, the collective data movement is recognized in exactly the same way as described above even in the replicated case where there are a plurality of transmitting processors, i.e., owners of an array element, or even in the state where a plurality of receiving processors exist. By making the best use of a plurality of transmitting processors and dividing data movement by the number of transmitting processors, it becomes possible to reduce the number of synchronizations between processors.

The data structure of the set of four in a quadruplet is as follows:

Decomposition index (dx)
Processor step (ps)
Number of decompositions (nd)
Total number of processors (np)

The set of four, (dx:ps:nd:np), specifies a plurality of processors in one-dimensional processor form. The relationship between the four elements is as follows. Where the total number of processors is np (processors 1 through np) and one processor decomposition expresses a group of ps processors, then one-dimensional processor form is constituted by a row of processor decompositions such as rf iterations of nd processor decompositions can be expressed by the following Equation:

$$rf=np/ps/nd \qquad \text{[Equation 6]}$$

The decomposed position dx of the quadruplet specifies a position in a row of nd processor decompositions. Specifying a processor decomposition is equal to specifying ps×rf processors, as shown in FIG. 8.

For example, consider a quadruplet, (1:2:4:32). From one-dimensional processor form of 32 processors, a single processor decomposition represents 2 processors. Four processor decompositions are iterated four times (4=32/(2*4)). One iteration is 8 processors. The decomposed position 1 is iterated and indicates the first one of the respective processor decompositions. consequently, this quadruplet specifies processors 1, 2, 9, 10, 17, 18, 25, and 26.

High-speed recognition of collective data movement at runtime

With an ITR list and a quadruplet, broadcast data movement, shift data movement, and all gather data movement, can be detected by the calculation of the data movement related to a self-processor.

Broadcast data movement

The set arithmetic of the quadruplet, performed when a data movement section is obtained, leaves information, indicating which processor likewise acquires an ITR which a self-processor acquires, in the ITR master. Therefore, when the data movement of an array section such as becoming broadcast data movement is obtained, the quadruplet of the ITR master, in the calculation of a data movement set of reception, indicates that a plurality of processors receive the same array section. Such an ITR master has been obtained in respective processors.

In the calculation of a data movement set of transmission, on the other hand, the quadruplet of combined ITRs indicates a group of receiving processors which receive the same array section. Therefore, with this, broadcast data movement is recognized. Since recognition such as this is performed without transmitting or receiving information between processors, the constitution of a processor group necessary for calling out a collective data movement library becomes possible without taking unnecessary synchronization between processors.

Shift data movement

Shift data movement is a result of regular array access based on a fixed offset. In this case, only a regular ITR list is constituted and shift data movement is recognized.

In regular problems, the regularity of array access is reflected on an ITR list. The ITR list is compressed by the regularity. This compression is not performed solely for the purpose of reducing a memory quantity. If the ITR list of a certain array dimension is compressed for regularity, access to another processor in the dimension can be calculated without scanning the ITR list.

All gather data movement and all-to-all data movement

Consider a processor group constituted from a plurality of processors. In the case where a certain data movement processor of the group transmits the same array region to all other receiving processors and where the transmission is performed for all transmitting processors, this collective data movement is called all gather data movement. Typically, all gather data movement is performed by matrix multiplication.

In the case of all gather data movement, a processor group (quadruplet of an ITR master) which tries to acquire an ITR from an ITR list becomes equal to a processor group (quadruplet of an ITR) which becomes the data movement opponent of the array section. In that case all gather data movement is recognized. Also, all-to-all data movement is likewise recognized. The differing point of all-to-all data movement from all gather data movement is that a different array region is transmitted.

FIG. 10 is a graph showing the performance difference between the case where LU decomposition (kernel n=2000) used one-to-one data movement and the case where LU decomposition (kernel n=2000) used broadcast data movement by actually applying the algorithm of the present invention, with relation to the effect of the number of processors. This graph shows that it is very important to make the best use of a broadcast data movement library and at the same time shows an improvement effect in the performance of the algorithm of the present invention. It is found that, as compared with the case where the collective data movement library provided in a parallel computer system is not used, performance is enhanced by making the best use of the collective data movement library to which the algorithm of the present invention is applied.

An embodiment of the present invention will be executed in the following flow.

(1) AOS Generation (2) LIS Generation (3) IOS Generation (4) Collective Data Movement Recognition AOS is short for an array ownership set and is a data structure where array decomposition is described. In the case of HPF, a result where an array was distributed is described with block (n) and Cyclic (n). LIS is short for a local iteration set and is a specific iterative loop space distributed to each processor, based on an owner computes rule. The generation of these is performed at the time of compiling to the utmost and reduces the execution-time overhead, however, in the case of insufficient information, the generation is performed at runtime. Even in the case where the generation is performed at runtime, it is possible to reduce the execution-time overhead by reusing the result of the generation.

(1) AOS Generation

In the case of HPF, mapping of a pd-dimensional processor form $P(m_1, \ldots, M_{pd})$ and an ad-dimensional array A $(n_1, \ldots, n_{ad})$ is performed. $A_i$, which is the i-th A, is divided by the j-th P, or it is not divided completely (i.e., it is collapsed). The dimension of P where no division is performed is replicated.

In the case where $A_i$ has been divided by $P_j$, the i-th ITR list of the AOS is expressed like the following Equation (7).

Note that $R_K$ is determined according to a distribution method.

$$M^{Pj} = \sum_{l=1}^{j-1} m_l; m_j; np \quad \text{[Equation 7]}$$

$$ITRL_{AOS_i^A} = (M^{Pj}) \{[R_{mdx}^{A,i}, \emptyset]\}$$

$i$-th $AOS_i$ of AOS: ITR list, $ITRL_{AOS_i^A}$

Number of processors: $np = \sum_{l=1}^{pd} m_l$

Array section of the $mdx$-th ITR: $R_{mdx}^{A,i}$ [Equation 7]

(2) LIS Generation

The iterative space of a nested loop before being distributed to a processor is called a global iteration set, which will hereinafter be referred to a GIS. The d-th $GIS_d$ of the GIS is classified based on whether it corresponds to the dimension of the left side array A. When there is correspondence, the subscript equation of a corresponding array dimension can be expressed by employing the index variable $iv_d$ of the $GIS_d$. When there is no correspondence, the d-th $GIS_d$ of the GIS, as it is, constitutes an LIS.

If $GIS_d$ corresponds to the il-th array, $GIS_d$ is divided based on an owner computes rule and becomes $LIS_d$. Here, the lower limit, upper limit and step of a loop are taken to be $lb_d$, $ub_d$, and $by_d$, respectively, and the subscript equation of an array is expressed as $S_{il}(iv_d)$. With this assumption, by employing the $GIS_d$, a region which each processor accesses at the left side (hereinafter referred to as an LWS) is obtained by the intersection between $S_{il}.GIS_d$ and the array section of each ITR on $ITRL_{AOS}$. $p^1$ is the processor form where the left side is distributed, and j1 is the dimension of the P1 to which the array dimension il corresponds.

$$RLWS_{mdx}^{il,d} = \{S_{il}(iv_d)\}_{iv_d-lb_d:ub_d:by_d} \cap R_{mdx}^{A,il}$$

$$ITRL_{LWS^{il}_A} = (M^{P1,j1})\{[RLWS_{mdz}^{il,d}, \emptyset]\} \quad \text{[Equation 8]}$$

The $LIS_d$ can be obtained as in the following equation:

$$RLIS_{mdx}^{il,d} = S_{il}^{-1}(RLWS_{mdx}^{il,d})$$

$$ITRL_{LIS_d} = (M^{P1,j1})\{[RLIS_{mdx}^{il,d}, \emptyset]\} \quad \text{[Equation 9]}$$

(3) IOS Generation

The array region of the right side B which is accessed with the LIS is called a local read set (LRS). An IOS is calculated by the arithmetic between an LRS and an AOS. The ir-th $B_{ir}$ of the right side B is divided based on whether there is the correspondence with a GIS. When there is no correspondence, the ir-th Bir, as it is, constitutes an LRS.

Consider the case where the ir-th Bir of B and the d-th $GIS_d/LIS_d$ of a loop correspond with each other. The subscript equation of the Bir is assumed to be $T_{ir}(iv_d)$. The LRS is calculated by $T_{ir}.LIS_d$ and becomes like the following equation:

$$RLRS_{mdx}^{ir,il,d} = T_{ir}(RLIS_{mdx}^{il,d})$$

$$ITRL_{LRS_{ir}}^B = (M^{P1,j1})\{[RLRS_{mdx}^{ir,il,d}, \emptyset]\} \quad \text{[Equation 10]}$$

Now, the ITR division (this is indicated by adding "~" over "/") will be defined. The ITR division is performed by dividing an ITR of the ITR list which is a dividend by an ITR of the ITR list which is a divisor. As a result of the division, if the array section of the dividend ITR is taken to be $R_s$ and the array section of the divisor ITR is taken to be $R_d$, $R_s \cap R_d$ will be obtained for the array section of ITR and (decomposition position of the divisor ITR: divisor ITR master) will be obtained for the quadruplet. The division is performed for each $R_d$ which is $R_s \cap R_d \neq \phi$.

Here, if it is assumed that $P_r$ is the processor form where the right side is distributed and that jr is the dimension of pr to which the array dimension ir corresponds, $ITRL_{AOS}$ will be expressed like the following equation:

$$ITRL_{AOS_{ir}}^B = (M^{Pr,jr})\{[R_{mdx}^{B,ir}, \emptyset]\} \quad \text{[Equation 11]}$$

The IOS is shown like the following equation by obtaining the ITR division of two ITR lists.

$$ITRL_{IS_{ir}}^B = ITRL_{LRS_{ir}}^B \tilde{/} ITRL_{AOS_{ir}}^B$$

$$ITRL_{OS_{ir}}^B = ITRL_{AOS_{ir}}^B \tilde{/} ITRL_{LRS_{ir}}^B \quad \text{[Equation 12]}$$

These are called an in/out set (IOS). The meaning of the arithmetic of these is as follows. If the ITR list of the LRS is divided by the ITR list of the AOS, the resultant ITR list will obtain an in set ($ITRL_{IS}$) which describes from which processor each processor reads the respective array regions which are accessed at the right side. Also, if the ITR list of the AOS is divided by the ITR list of the LRS, the resultant ITR list will obtain an out set ($ITRL_{OS}$) which describes a region which is read among the array regions that each processor has and a processor which is read. In the case of the array dimension which has not been divided, $\phi$ which indicates that there is no division is put into the decomposition position of the quadruplet of the ITR.

For example, consider $ITRL_{LRS}$=<1:2:4>{[2:11, $\phi$], [12:20, $\phi$]} and $ITRL_{AOS}$=<2:2:4>{[1:10, $\phi$],[11:20, $\phi$]}. <1:2:4>{[2:10,1:2:2:4] [11,2:2:2:4][12:20,2:2:2:4]} is obtained for the in set, and <2:2:4>{[2:10,1:1:2:4][11, 1:1:2:4][12:20,2:1:2:4]} is obtained for the out set.

(4) Collective Data Movement Recognition

The method of making an ITR product of ITR lists of each dimension of the in set or the out set and calculating a data movement set has already been described in the column of the "ITR List." Here, a description will be specifically made of how collective data movement is detected when obtaining a data movement descriptor.

Shift Data Movement

The ITR list will be compressed if there is regularity. Now, consider the case where the ITR lists of all dimensions of the IOS have been compressed by regularity, or the case where ITR lists are common to all processors. In the case where the quadruplet of the data movement destination of ITR is expressed with the linear expression $mdx_i + c_i$ of the decomposition position mdxi of the ITR, the compressed dimension i is recognized as shift data movement. In the shift data movement, there is the data movement between processors of which the distance is a vector ( . . . , $c_i$, . . . ) determined on the processor form. Therefore, the optimization specific to the shift data movement becomes possible.

Broadcast Data Movement

In the case where there are other processors which share the data movement descriptor obtained from the in set, i.e., in the case where there are a plurality of processors which receive the same array region, broadcast data movement is recognized. However, there is excluded the case of the following all gather data movement and all-to-all data movement. With the ITR product when obtaining a data movement descriptor from the in set, the $\cap$ arithmetic is performed for the data movement source quadruplet, and in the case of the in set, the $\cap$ arithmetic is also performed for the reception quadruplet. When the resultant reception quadruplet has specified a plurality of processors, the data movement descriptor of the result of the ITR product is common to the processors. In LU decomposition which will be described later, a recognition example of the broadcast data movement is shown.

All Gather Data Movement and All-to-All Data Movement

In the case where, on the in/out set, the processor group expressed by the data movement destination quadruplet equals the processor group expressed by the data movement source quadruplet, all-gather data movement or all-to-all data movement is recognized. The difference of the two is that while the former transmits the same array region, the latter transmits a different region to each opponent processor.

Gather Data Movement and Scatter Data Movement

Consider the case where only a single processor can constitute a data movement descriptor from the in set and where the ITR block to which the processor relates has a plurality of ITRs which indicate different processors. Also, all ITR lists of the out set have been either compressed by regularity or are common to all processors. Therefore, it is found that all transmitting processors transmit data to a single processor. The aforementioned case is recognized as gather data movement. The case of scatter data movement is the reverse of this.

Collective Data Movement Recognition Example: LU Decomposition

With the program list of the LU decomposition shown in FIG. 1, a description will be made of an actual operation where the present algorithm recognizes broadcast data movement when n is 128 and the number of processors is 32.

(1) AOS Generation

Figures 1, 2:
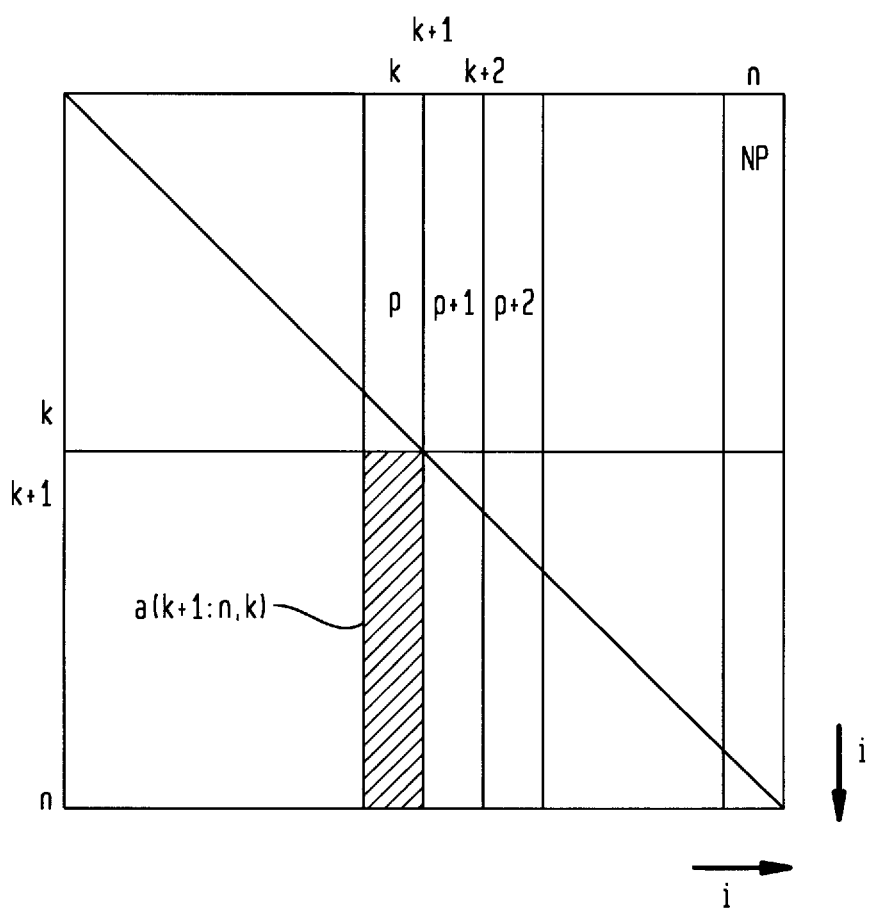
FIG. 1 shows an example of a program list of LU decomposition described in HPF for explaining a prefetch.
FIG. 2 is a conceptual diagram used to explain the data movement in the prefetch.
Figures 3, 4:
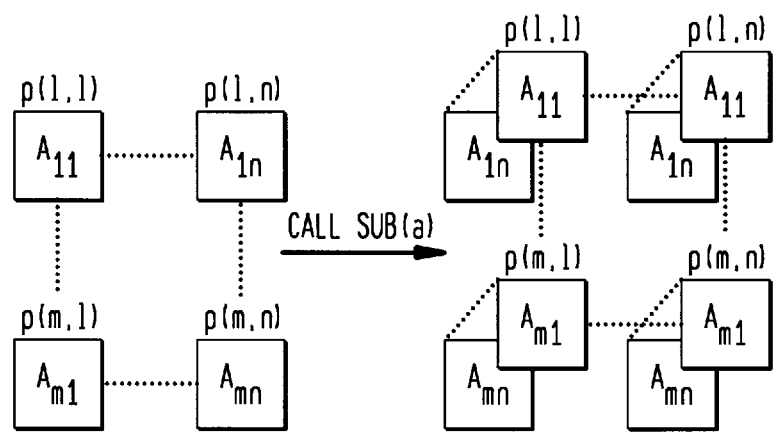
FIG. 3 shows an example of a program list described in HPF for explaining redistribution.
FIG. 4 is a conceptual diagram used to explain the data movement in the redistribution.

In the program list of FIG. 1, the second dimension of the AOS of an array a is cyclic, and the ITRL is expressed by the following equation by employing thereafter $mdx = 1 + mod((p-1)/1,32)$ for processor p ($1 \leq p \leq 32$).

$$ITRL_{AOS_1}a = (1:1:32)\{[1:128:1,0]_1 \ldots _{32}\}$$

$$ITRL_{AOS_2}a = (1:32:32)\{[p:96+p:32,0]_1 \ldots _{32}\} \qquad \text{[Equation 13]}$$

$[R,Q]_{p \ldots q}$ indicates the ITR from processor p to processor q.

(2) LIS Generation

From $GIS_2 = (113:128:1)$, in the case of $k=112$, the array subscript equation $S=j$, and $ITRL_{AOS2}a$, an LWS is expressed by the following Equation.

$$ITRL_{LWS_2}a = (1:32:32)\{[]_1 \ldots _{16}, [96+p:96+p:32,0]_{17} \ldots _{32}\} \qquad \text{[Equation 14]}$$

Since $ITRL_{AOS2}a$ and $S^{-1}$ are self-evident, the ITR list of the LIS of a j loop becomes as the following Equation (15).

$$ITRL_{LISj} = <1:32:32>\{[]_1 \ldots _{16}, [96+p:96+p:32,0]_{17} \ldots _{32}\} \qquad \text{[Equation 15]}$$

$[]_{p \ldots q}$ indicates that the ITR from processor p to processor q contains nothing in it. Also, since the first dimension of an array corresponding to an i loop has not been divided, the LIS of the i loop is the same as the GIS, so it becomes as follows.

$$ITRL_{LIsi} = <1:1:32>\{[113:128:1,0]_1 \ldots _{32}\} \qquad \text{[Equation 16]}$$

(3) IOS Calculation

Now, pay attention to the right side array a(i,k) in the case of k =112. Since the $ITRL_{LISi}$ and the array subscript equation i of the first dimension correspond, the LRS of a(i,112) becomes as follows.

$$ITRL_{LRS_1}a(i,k) = (1:1:32)\{[]_1 \ldots _{16}[113:128:1,0]_{17} \ldots _{32}\}$$

$$ITRL_{LRS_2}a(i,k) = (1:32:32)\{[]_1 \ldots _{16}, [112:112:1,0]_{17} \ldots _{32}\} \qquad \text{[Equation 17]}$$

Here, since processors which do not participate in loop execution do not access a(i,k), a group of processors having an ITR which is not empty in the $ITRL_{LISj}$ of a j loop not corresponding to the processor a(i,k) is used as a mask. If, for the ITRL obtained by the above equation, ITR division is performed for each array dimension, the following in/out set will be obtained.

$$ITRL_{IS_1}a(i,k) = (1:1:32)\{[]_1 \ldots _{16}[113:128:1,0:1:1:32]_{17} \ldots _{32}\}$$

$$ITRL_{IS_2}a(i,k) = (1:32:32)\{[]_1 \ldots _{16}[112:112:1,16:1:32:32]_{17} \ldots _{32}\}$$

$$ITRL_{OS_1}a(i,k) = (1:1:32)\{[113:128:1,17 \ldots 32:1:1:32]_1 \ldots _{32}\}$$

$$ITRL_{OS_2}a(i,k) = (1:32:32)\{[]_1 \ldots _{15}, [112:112:1,17 \ldots 32:1:32:32]_{16,[]17 \ldots 32}\} \qquad \text{[Equation 18]}$$

(4) Collective Data Movement Recognition $ITR^P_{IS1} \in ITRL_{IS1a(i,k)}$ and $ITR^P_{IS2} \in ITRL_{IS2a(i,k)}$ of processor p are extracted. The reception and transmission based on these ITRs become as follows.

$$ITR^P_{IS_1} \uparrow ITR^P_{IS_2} = \qquad \text{[Equation 19]}$$
$$\begin{cases} \emptyset & p = 1 \ldots 16 \\ (113:128, 112), 16:1:32:32 & p = 17 \ldots 32 \end{cases}$$

$$ITR^P_{OS_1} \uparrow ITR^P_{OS_2} =$$
$$\begin{cases} \emptyset & p = 1 \ldots 15, \\ & 17 \ldots 32 \\ (113:128, 112), 17 \ldots 32:1:32:32 & p = 16 \end{cases}$$

Since the ITR block is constituted only by a single ITR, this becomes the entire data movement set. Processors 17 through 32 continue to have the same 17 . . . 32:1:32:32 as a data movement source quadruplet when calculating the ITR product of an in set. Therefore, since those processors find that they have the same data movement descriptor, broadcast data movement is recognized.

Although the present invention has been described in connection with a specific embodiment thereof, it should be evident that many variations may be apparent to those skilled in the art. Accordingly, it is understood that the invention is intended to cover such variations as expressed by the spirit and scope of the appended claims.

We claim:

1. A method of optimizing recognition of collective data movement in a parallel distributed system, comprising the steps of:

a) forming a data movement set into a data structure where access regularity is efficiently used with respect to regular problems and introducing processor expression independent of the number of processors;

b) calculating the data movement set for each dimension of an array by using said data structure and said processor expression; and c) extracting the collective data movement when constructing data movement from said data movement set of each dimension.

2. The method of claim 1 wherein step a) includes forming a data movement set into an ITR list (ITRL) where ITRL=[bg: eg: st,dx: ps: nd: np].

* * * * *